United States Patent
Becerra Alfonso et al.

(10) Patent No.: US 11,719,071 B2
(45) Date of Patent: Aug. 8, 2023

(54) SYSTEM AND METHODOLOGY FOR MONITORING IN AN INJECTION WELL

(71) Applicant: Schlumberger Technology Corporation, Sugar Land, TX (US)

(72) Inventors: Jerson Orlando Becerra Alfonso, Bogota (CO); Anderson Arboleda Correa, Bogota (CO); Andrea Ximena Guerrero Avendaño, Bogota (CO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 313 days.

(21) Appl. No.: 16/984,549

(22) Filed: Aug. 4, 2020

(65) Prior Publication Data

US 2021/0040818 A1    Feb. 11, 2021

Related U.S. Application Data

(60) Provisional application No. 62/884,371, filed on Aug. 8, 2019.

(51) Int. Cl.
*E21B 34/10*  (2006.01)
*G01K 1/14*  (2021.01)
(Continued)

(52) U.S. Cl.
CPC .............. *E21B 34/10* (2013.01); *E21B 43/20* (2013.01); *E21B 47/06* (2013.01); *E21B 47/07* (2020.05); *G01K 1/08* (2013.01); *G01K 1/14* (2013.01); *G01L 19/0038* (2013.01); *G01L 19/0092* (2013.01); *G01L 19/0627* (2013.01)

(58) Field of Classification Search
CPC .......... E21B 34/10; E21B 47/06; E21B 47/07; E21B 43/20; E21B 17/18; G01L 19/0038; G01L 19/0092; G01L 19/0627; G01K 1/022; G01K 1/08; G01K 1/14
See application file for complete search history.

(56) References Cited

U.S. PATENT DOCUMENTS 5,358,035 A * 10/1994 Grudzinski ........... E21B 34/066
340/856.4
5,706,892 A *  1/1998 Aeschbacher, Jr ... E21B 33/127
166/69

(Continued)

OTHER PUBLICATIONS

Omega Well Monitoring SPM Internal Gauge, available at least as early as Sep. 2018 (2 pages).

*Primary Examiner* — Christopher J Sebesta
(74) *Attorney, Agent, or Firm* — Michael Dae

(57) ABSTRACT

A technique facilitates monitoring of parameters related to a downhole operation, e.g. a water injection operation. A completion string may be deployed in a borehole with at least one water injection mandrel combined with a side pocket. A sensor tool is constructed for conveyance down through the completion string and into sealing engagement with the interior surface of the side pocket. The sensor tool comprises at least one sensor for sensing a desired parameter or parameters, e.g. pressure and/or temperature. Additionally, the sensor tool comprises a nose which is positioned to mechanically open a check valve coupled to the side pocket so as to enable monitoring of the desired parameter or parameters via the at least one sensor.

18 Claims, 4 Drawing Sheets

(51) Int. Cl.
*G01L 19/00* (2006.01)
*G01K 1/08* (2021.01)
*E21B 43/20* (2006.01)
*G01L 19/06* (2006.01)
*E21B 47/06* (2012.01)
*E21B 47/07* (2012.01)

(56) References Cited

U.S. PATENT DOCUMENTS

| | | | | |
|---|---|---|---|---|
| 5,896,924 | A * | 4/1999 | Carmody | E21B 43/123 |
| | | | | 166/69 |
| 8,528,395 | B2 * | 9/2013 | Griffiths | E21B 43/12 |
| | | | | 73/152.51 |
| 2012/0006563 | A1 * | 1/2012 | Patel | E21B 43/14 |
| | | | | 166/325 |

* cited by examiner

SYSTEM AND METHODOLOGY FOR MONITORING IN AN INJECTION WELL

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application claims priority benefit of U.S. Provisional Application No. 62/884,371, filed Aug. 8, 2019, the entirety of which is incorporated by reference herein and should be considered part of this specification.

BACKGROUND

Various types of wells are used in the production of hydrocarbon fluids such as oil and gas. For example, production wells may be used in producing fluids from a subterranean formation to a surface collection location. However, injection wells and other types of wells also may be used to facilitate retrieval of the hydrocarbon fluids from the formation. In some well applications, water injection wells are employed to help drive or push the desired hydrocarbon fluids to the corresponding production well or wells. Water may be injected into corresponding well zones through water injection mandrels. However, monitoring of well conditions at a given well zone or along a plurality of well zones can be difficult during water injection operations.

SUMMARY

In general, a system and methodology are provided for facilitating the monitoring of parameters, e.g. pressure and/or temperature, related to a downhole operation, e.g. a water injection operation. According to an embodiment, a completion string may be deployed in a borehole with at least one water injection mandrel combined with a side pocket. A sensor tool is constructed for conveyance down through the completion string and into sealing engagement with the interior surface of the side pocket. The sensor tool comprises at least one sensor for sensing a desired parameter or parameters, e.g. pressure and/or temperature. Additionally, the sensor tool comprises a nose which is positioned to mechanically open a check valve coupled to the side pocket of the water injection mandrel so as to enable monitoring of the desired parameter or parameters via the at least one sensor.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
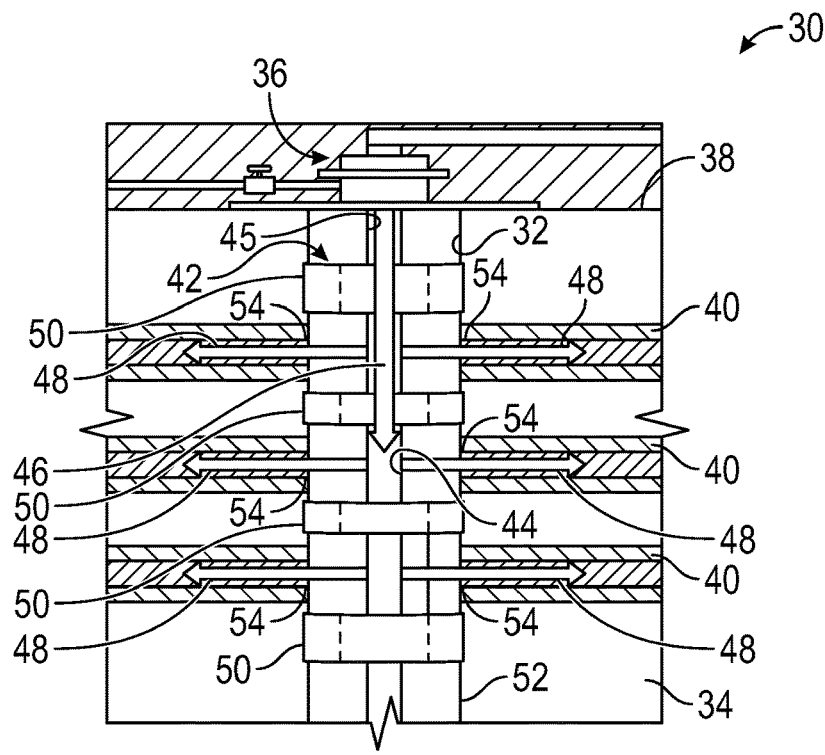
FIG. 1 is a schematic illustration of an example of a multizone water injection well having a water injection completion, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology for facilitating the monitoring of parameters related to a downhole operation. For example, pressure and/or temperature may be monitored during a downhole water injection operation. In some applications, the downhole operation may involve a well with multiple water injection zones. The parameters, e.g. pressure and temperature, may be monitored at each of the well zones or at individual well zones as injection operations are performed in other well zones. In this manner, data may be acquired which helps a well operator optimize production of hydrocarbon fluids from corresponding production wells via monitoring of the pressure, temperature, and/or other parameters related to the injection of water into the formation to induce the improved hydrocarbon fluid production.

According to an embodiment, a completion string may be deployed in a borehole with at least one water injection mandrel having a side pocket. A side pocket is a pocket, e.g. a receptacle, located along the interior of the water injection mandrel and offset from a center of the main flow passage through the completion string. In some embodiments, the completion string extends along a plurality of well zones and comprises a plurality of water injection mandrels positioned at corresponding well zones. Additionally, a sensor tool is constructed for conveyance down through the completion string and into sealing engagement with an interior surface of the side pocket.

The sensor tool comprises at least one sensor for sensing a desired parameter or parameters, e.g. pressure and/or temperature. Additionally, the sensor tool comprises a nose which is positioned to mechanically open a check valve which may be coupled to the side pocket of the water injection mandrel. Opening the check valve enables monitoring of the desired parameter or parameters via the at least one sensor. In some embodiments, the nose comprises a tube eccentrically mounted on a nose housing so as to better enable mechanical operation of the check valve. The tube has an interior passage which is in fluid communication with a central passage or otherwise routed passage through the sensor tool to the sensor.

According to some embodiments, the sensor may be in the form of a selective injection pressure sensor (SIPS) which is able to obtain pressure information (and/or other information). The pressure information may be used, for example, to determine whether more or less water should be injected at specific injection well zones. The sensor tool containing the sensor may be constructed with a geometry which enables the sensor to record reservoir pressure, for example, on a target well zone. A seal system mounted along an exterior of the sensor tool enables sealing engagement with inside diameter seal areas of the side pocket to isolate injection pressure in the completion string from reservoir pressure.

The nose of the sensor tool may be constructed in various configurations. According to an embodiment, the nose may be located at a bottom end of the sensor tool and oriented to effectively enable bypassing of a check valve installed along the water injection mandrel, thus allowing recording of desired parameters, e.g. pressure and temperature. The data from the monitored parameters, e.g. pressure and temperature, may be stored on a memory of the sensor or at another suitable storage location for use once the sensor tool is retrieved to the surface. This data may then be analyzed to determine, for example, changes which can be made to further optimize production of hydrocarbon fluids from corresponding production wells. For example, pressure and temperature data may be used to help determine appropriate modification of water injection rates at specific well zones.

Referring generally to FIG. 1, an embodiment of an injection well system 30 is illustrated. In this example, the injection well system 30 comprises a borehole 32 extending down into a subterranean formation 34 from a wellhead 36 positioned at a surface location 38. The borehole 32 extends through a plurality of well zones 40. Additionally, a completion string 42 is deployed down through the borehole 32 and through the plurality of well zones 40.

According to this embodiment, the completion string 42 is a water injection string having an internal passage 44, e.g. a main flow passage 45, along which water is delivered, as represented by arrow 46. The water 46 is injected into the surrounding formation 34 in at least some of the well zones 40 as indicated by arrows 48. As explained in greater detail below, the injected water 48 may be injected at tubular members having side pockets fitted with water injection mandrels.

The completion string 42 also may comprise a plurality of packers 50 positioned to isolate the sequential well zones 40 along borehole 32. Thus, as injected water is forced out through a water injection mandrel associated with a given well zone 40, the water is forced out into the surrounding formation 34. In some operations, the borehole may be lined with a casing 52 and the injected water may be forced out through perforations 54 formed through the casing and out into the surrounding formation 34.

Figure 2:
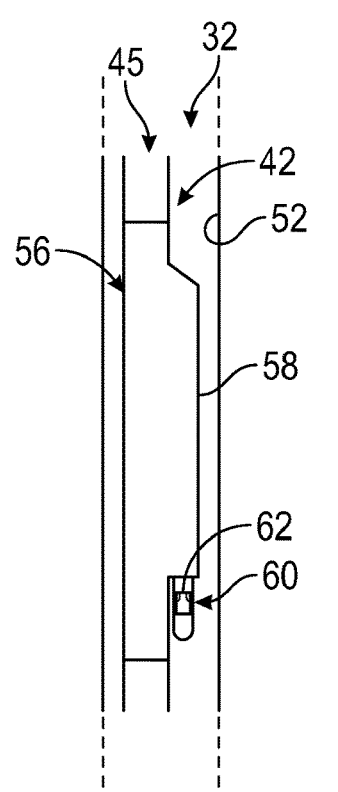
FIG. 2 is a schematic illustration of a portion of a completion string having a tubular member/water injection mandrel having a side pocket combined with a check valve, according to an embodiment of the disclosure.

Referring generally to FIG. 2, a portion of completion string 42 is illustrated as having a tubular member 56, e.g. a water injection mandrel, with a side pocket 58. The side pocket 58 is offset from a centerline of the main flow passage 45 of completion string 42. In this example, a check valve 60 is coupled with the side pocket 58 to direct the outflow of injected water 48 which is then forced into the surrounding well zone 40 of formation 34 (see also FIG. 1).

As explained in greater detail below, the water injection mandrel 56/side pocket 58 utilize check valve 60 which is oriented to open and allow fluid flow therethrough during injection of water 48 into the surrounding well zone 40 while closing to prevent a reverse flow of fluid. For example, if the flow of injected water 48 is interrupted or stopped, the check valve 60 automatically closes to prevent flow of fluid into side pocket 58 and completion string 42 from the environment external to side pocket 58. The check valve 60 may have various check valve mechanisms 62 for enabling transition between closed and open positions.

Figure 3:
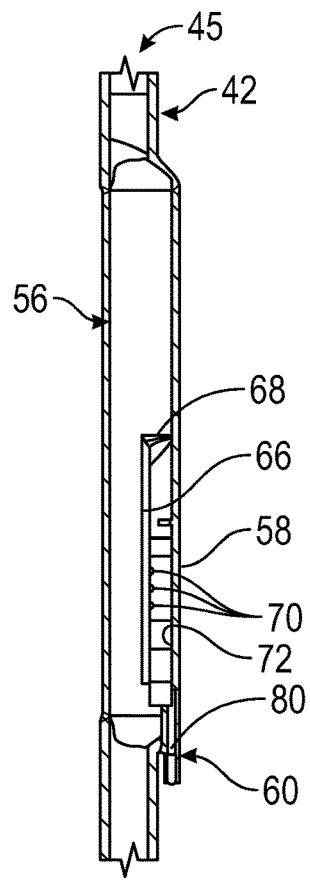
FIG. 3 is a partially broken away view of an example of the tubular member/water injection mandrel having the side pocket combined with the check valve, according to an embodiment of the disclosure.
Figure 4:
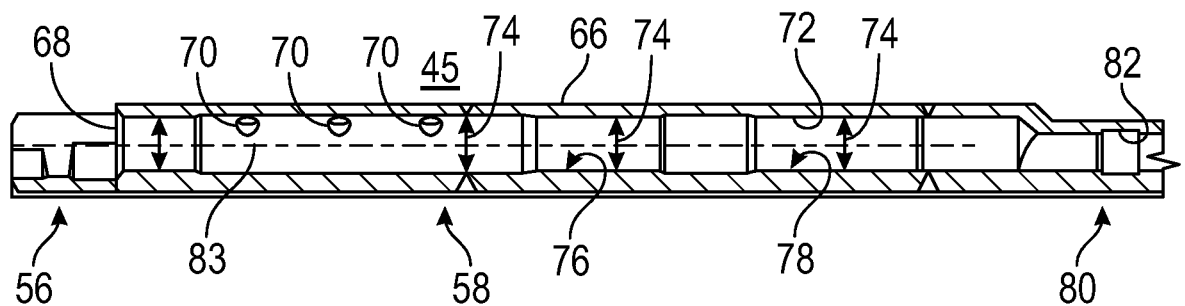
FIG. 4 is a cross-sectional illustration of an example of a side pocket formed along a water injection mandrel of the water injection completion, according to an embodiment of the disclosure.

As further illustrated in FIGS. 3 and 4, the side pocket 58 may be formed via a side pocket wall 66 which may include a portion of the external wall forming tubular member 56 of completion string 42. The side pocket 58 may have a top opening 68 and, in some embodiments, an opening or openings 70 positioned through side pocket wall 66. The side pocket 58 also has an interior surface 72 which may have sections with differing diameters 74 for some applications (see FIG. 4). In the example illustrated, the interior surface 72 comprises a plurality of seal areas, e.g. an upper seal area 76 and a lower seal area 78.

Additionally, the side pocket 58 may comprise an attachment region 80 to which the check valve 60 may be coupled. By way of example, the attachment region 80 may comprise threads 82 to which the check valve 60 may be threadably engaged. The configuration of attachment region 80 may vary according to the desired construction of water injection mandrel 56, check valve 60, or other design considerations. In the example illustrated, the attachment region 80 is offset with respect to a centerline 83 of the side pocket 58.

Figure 5:
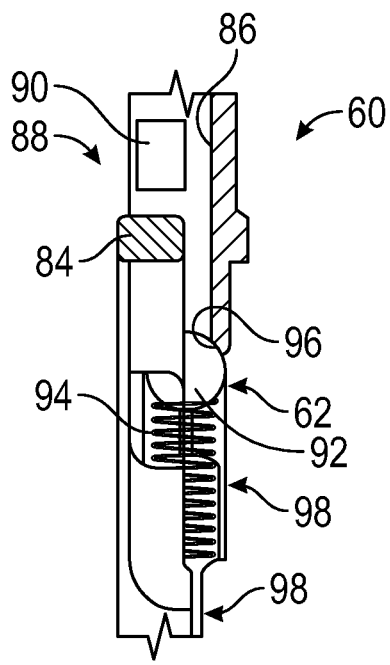
FIG. 5 is a partially broken away view of an example of a water injection mandrel check valve, according to an embodiment of the disclosure.
Figure 6:
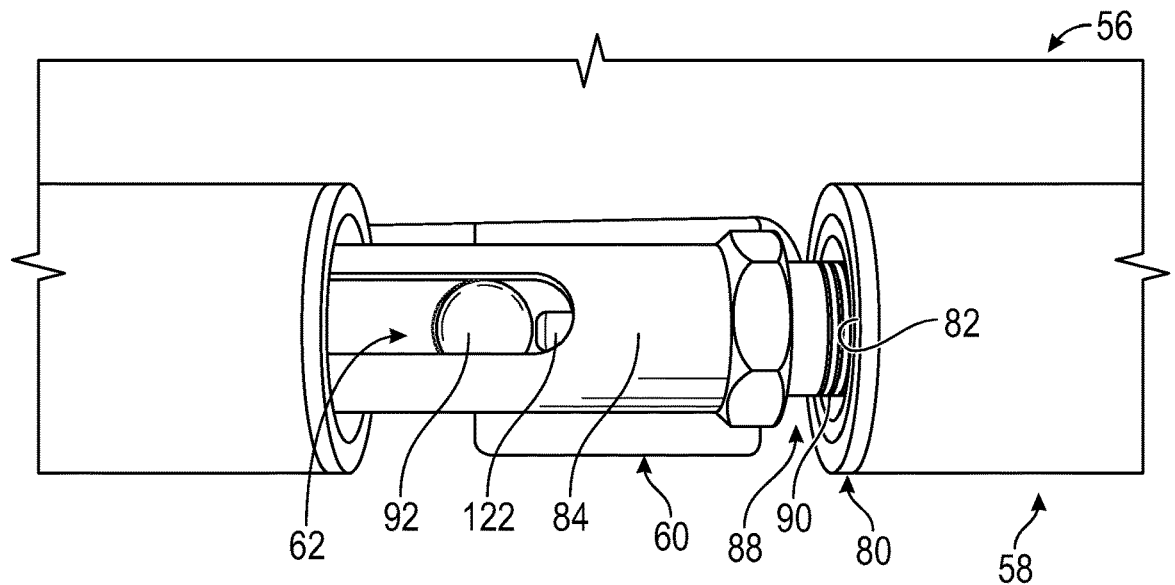
FIG. 6 is a side view of an example of a check valve located along a water injection mandrel, according to an embodiment of the disclosure.

Referring generally to FIGS. 5 and 6, embodiments of the check valve 60 are illustrated as having a check valve body 84 with an internal flow passage 86. The check valve body 84 also comprises an attachment region 88 configured for coupling with attachment region 80 of side pocket 58. By way of example, the mandrel attachment region 80 may comprise threads 90 which may be used for threaded engagement with threads 82 when attaching the check valve 60 to side pocket attachment region 80.

In this example, the check valve 60 comprises a ball 92 which may be biased by a spring member 94, e.g. a coil spring, toward sealing engagement with a ball seat 96 (see FIG. 5). The position of ball 92 and the orientation of spring member 94 is selected to automatically close off flow along internal flow passage 86 when water injection is stopped, thus preventing reverse flow into the side pocket 58 and water injection mandrel 56. However, under the pressure of water during a water injection operation, the ball 92 is moved against the bias of spring member 94 and away from ball seat 96 to allow the flow of injected water through internal flow passage 86 and out of check valve 60. In some embodiments, the injected water may be directed out of the check valve 60 through an appropriate opening/nozzle 98 or other suitable outlet.

Figure 7:
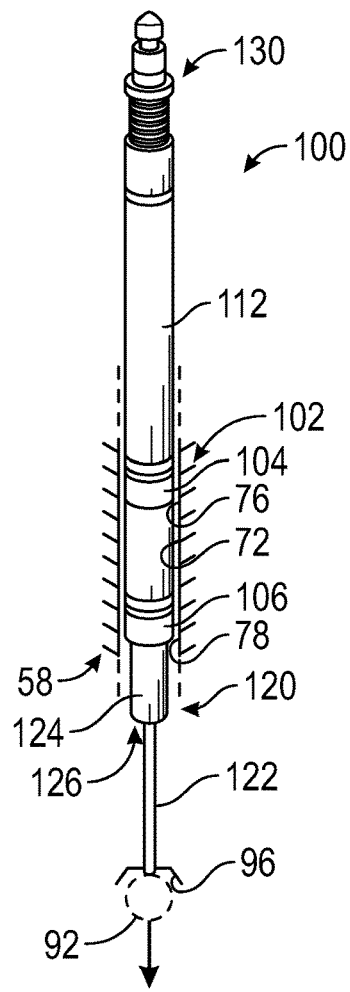
FIG. 7 is a side view of an example of a sensor tool configured for receipt in the side pocket, according to an embodiment of the disclosure.

Referring generally to FIG. 7, an embodiment of a sensor tool 100 is illustrated as retrievably deployed in side pocket 58 (see also FIG. 2). The sensor tool 100 is sized for receipt in the side pocket 58 and comprises a seal system 102 along an exterior of the sensor tool 100. The seal system 102 is oriented to form a seal between the sensor tool 100 and the interior surface 72 of side pocket 58.

By way of example, the seal system 102 may comprise a plurality of seals, such as an upper seal 104 and a lower seal 106. In this embodiment, the upper seal 104 is positioned for sealing engagement with upper seal area 76. Additionally, the lower seal 106 is positioned for sealing engagement with lower seal area 78 of side pocket 58. The inclusion of a plurality of seals can advantageously help isolate the formation pressure for more accurate measurements, for example as described herein.

Figure 8:
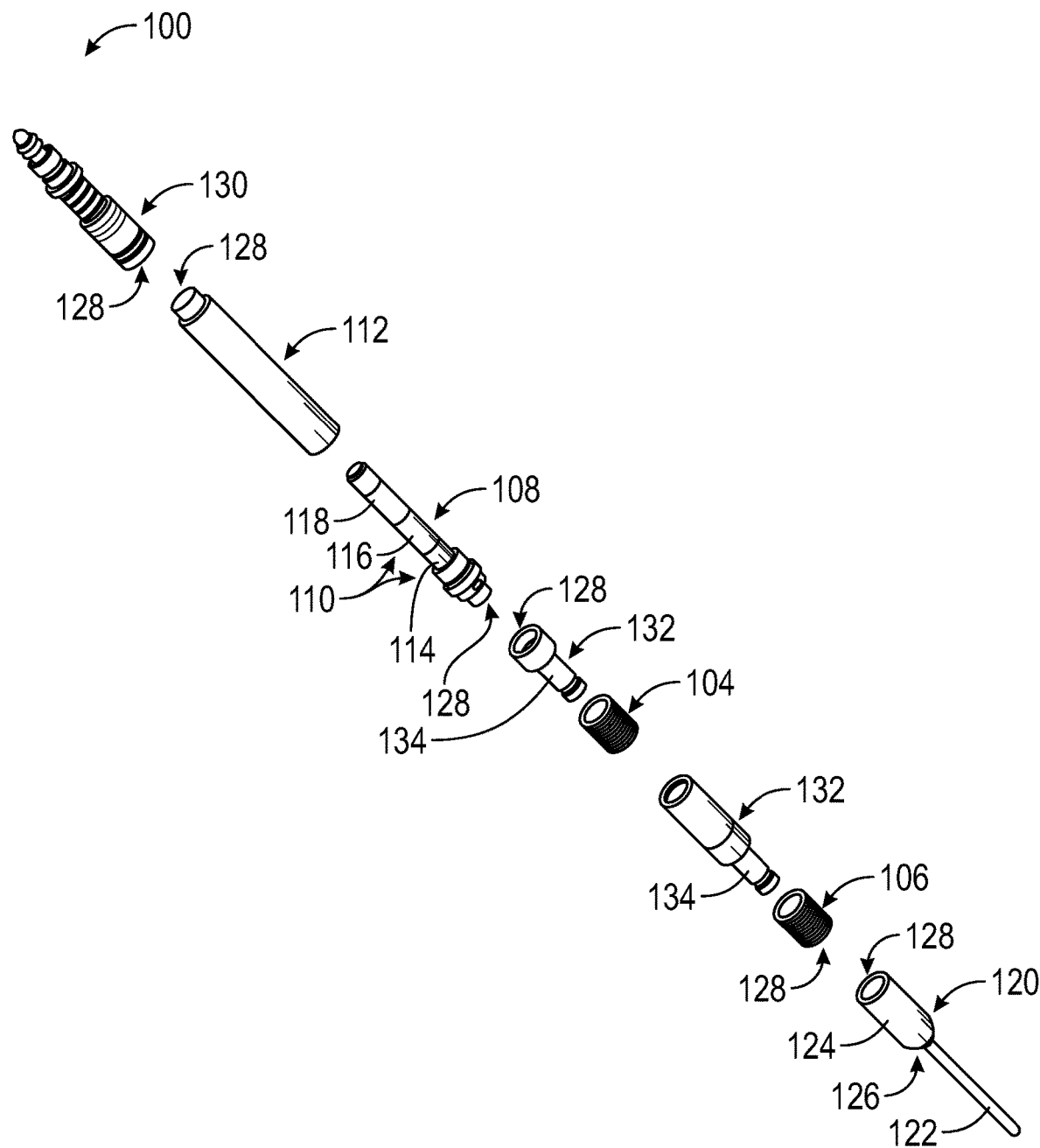
FIG. 8 is an exploded view of an example of the sensor tool, according to an embodiment of the disclosure.

With additional reference to FIG. 8, the sensor tool 100 also may comprise a sensor system 108 having a sensor 110 which may be protected by a gauge housing 112 or other suitable structure. By way of example, the sensor 110 may comprise an individual sensor or a plurality of sensors for sensing desired parameters, e.g. pressure and/or temperature. In the illustrated example, the sensor 110 may comprise at least one pressure sensor 114 and at least one temperature sensor 116.

Although the data from sensor(s) 110 may be transmitted to the surface via a suitable telemetry system, the illustrated embodiment stores data from the sensor(s) 110 on a suitable memory 118. The memory 118 may be located in sensor system 108. The data may be retrieved from memory 118 upon retrieval of the sensor tool 100 to a surface location.

Referring again to FIGS. 7 and 8, the sensor tool 100 also may comprise a nose 120 oriented to mechanically open the check valve 60 when the sensor tool 100 is sufficiently inserted into the side pocket 58 along interior surface 72. The nose 120 can have a size, shape, and/or length optimized to dimensions (e.g., length) of the side pocket 58, selected to accommodate a plurality of seals (such as seal system 102), and/or selected such that the nose 120 mechanically opens the check valve 60 when the sensor tool 100 is sufficiently inserted into the side pocket 58. For example, the nose 120 may be constructed to engage and move the ball 92 of check valve 60 away from ball seat 96 so as to enable monitoring of the desired parameter or parameters via sensor 110 (see FIGS. 6 and 7 showing ball 92 moved away from ball seat 96 via mechanical engagement with nose 120).

In some embodiments, the nose 120 comprises an extension 122, e.g. a tube or rod, eccentrically mounted on a nose housing 124 so as to better enable mechanical operation of the check valve 60. For example, the extension 122 may be sufficiently offset to pass through attachment region 80 of side pocket 58 and to engage the ball 92 (see FIG. 6). In this embodiment, the nose housing 124 has an interior passage 126 which is in fluid communication with a sensor tool passage 128, e.g. a central passage or other suitable passage routed through the sensor tool 100 to the sensor 110.

In some applications, the sensor 110 may be in the form of a SIPS which is able to obtain pressure information (and/or other information such as temperature information). The pressure information may be used, for example, to determine whether more or less water should be injected at a specific injection well zone or zones 40. The sensor tool 100 containing sensor 110 may be constructed with a geometry which enables the sensor 110 to record, for example, reservoir pressure on a target well zone 40. The seals 104, 106 mounted along an exterior of the sensor tool 100 provide sealing engagement with inside diameter seal areas 76, 78 of the side pocket 58 to isolate injection pressure in the completion string 42 from reservoir pressure acting externally of the side pocket 58.

The sensor tool 100 also may comprise a latch connector 130 configured for coupling with a conveyance used to deploy and retrieve the sensor tool 100. The latch connector 130 may be a conventional latch connector for deploying tools and other devices along the interior of a given completion string. However, the latch connector 130 may have other suitable designs to enable coupling with a conveyance, e.g. wireline, slick line, tubular conveyance, or other suitable conveyance, used to deploy and retrieve the sensor tool 100.

As illustrated in FIG. 8, the sensor tool 100 also may comprise seal carriers 132 having portions of the sensor tool passage 128 as well as mounting regions 134 about which seals 104, 106 may be mounted. The various components of the sensor tool 100 may be threadably engaged to form the overall sensor tool, however other types of suitable fasteners and attachment mechanisms may be used for coupling the various components of sensor tool 100.

It should be noted the completion string 42, side pocket 58, and sensor tool 100 may be constructed in various sizes and configurations. Additionally, components of the sensor tool 100 may have various configurations and may be arranged in desired sequences. For example, the seal system 102 may comprise an individual seal or a plurality of seals of varying types suitable for sealing engagement with the interior surface of side pocket 58 so as to isolate internal completion string pressures with respect to reservoir pressures. The sensor 110 also may comprise various types and arrangements of sensors. Similarly, various types of memories or other storage devices may be used for storing data from the sensor 110.

Additionally, the completion string 42 may comprise various numbers of water injection mandrels 56 to enable injection of water at corresponding well zones 40. An individual sensor tool 100 or a plurality of sensor tools 100 may be retrievably positioned in desired side pockets 58 which may be disposed along the various corresponding well zones 40. For example, an individual sensor tool 100 (or a plurality of sensor tools 100) may be used in a specific side pocket 58 (or side pockets 58) to obtain data from a specific well zone 40 (or well zones 40) as water injection operations are performed at other well zones 40.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for use in a well, comprising:
  a completion string deployed in a borehole, the completion string comprising a water injection mandrel having a side pocket to enable injection of water into a well zone through a check valve, the check valve being coupled to the side pocket and oriented to open when fluid flows through the water injection mandrel during injection of water into the well zone while closing to prevent a reverse flow of fluid; and
  a sensor tool sized for receipt in the side pocket, the sensor tool comprising:
    a sensor to sense a desired well related parameter;
    a seal system positioned to form a seal between the sensor tool and an interior surface of the side pocket; and
    a nose oriented to mechanically open the check valve when the sensor tool is inserted into the side pocket;
    wherein the nose comprises a tube eccentrically mounted on a nose housing.

2. The system as recited in claim 1, wherein the water injection mandrel comprises a plurality of water injection mandrels positioned along the completion string to enable injection of water at a plurality of corresponding well zones.

3. The system as recited in claim 2, wherein the sensor tool is retrievably positioned in one water injection mandrel of the plurality of water injection mandrels.

4. The system as recited in claim 2, wherein the sensor tool comprises a plurality of sensor tools retrievably positioned in selected water injection mandrels of the plurality of water injection mandrels.

5. The system as recited in claim 1, wherein the seal system comprises an upper seal positioned to seal with an upper seal area of the side pocket and a lower seal positioned to seal with a lower seal area of the side pocket.

6. The system as recited in claim 1, wherein the sensor comprises a pressure sensor.

7. The system as recited in claim 1, wherein the sensor comprises a temperature sensor.

8. The system as recited in claim 1, wherein the sensor comprises a plurality of sensors including a pressure sensor and a temperature sensor.

9. The system as recited in claim 1, wherein the sensor tool further comprises a gauge housing to protect the sensor.

10. The system as recited in claim 1, wherein the sensor tool further comprises a latch connector configured for coupling with a conveyance used to deploy and retrieve the sensor tool.

11. A system, comprising:
a sensor tool configured for sealing engagement with a side pocket located along a completion string, the sensor tool comprising:
a sensor protected by a gauge housing;
a plurality of seals located to enable the sealing engagement with an interior surface of the side pocket;
a nose extending at a bottom end of the sensor tool, the nose being oriented to provide communication between the sensor and fluids external to the completion string; and
a latch connector configured for engagement with a conveyance to enable deployment of the sensor tool into the side pocket and retrieval of the sensor tool from the side pocket;
wherein the nose comprises an extension eccentrically mounted on a nose housing and oriented to open a check valve disposed in a water injection mandrel coupled with the side pocket.

12. The system as recited in claim 11, wherein the sensor tool further comprises a plurality of seal carriers about which the plurality of seals may be mounted.

13. The system as recited in claim 11, wherein the sensor comprises a pressure sensor.

14. The system as recited in claim 11, wherein the sensor comprises a temperature sensor.

15. The system as recited in claim 11, wherein the sensor comprises a pressure sensor and a temperature sensor.

16. A method, comprising:
providing a sensor tool with a sensor, a nose, and a seal oriented for sealing engagement with a side pocket located along a completion string;
locating a check valve at the side pocket;
conveying the sensor tool along an interior of the completion string and into the side pocket;
sealing the sensor tool with respect to the side pocket via the seal; and
inserting the sensor tool sufficiently into the side pocket so the nose is able to mechanically open the check valve and to thus enable the sensor to obtain data regarding the environment external to the side pocket.

17. The method as recited in claim 16, further comprising using the sensor to monitor at least one of pressure or temperature in a well zone surrounding the side pocket as activities are performed in other well zones disposed along the completion string.

18. The method as recited in claim 16, further comprising retrieving the sensor tool to the surface to obtain data collected by the sensor.

* * * * *